(12) United States Patent
Sullivan et al.

(10) Patent No.: US 10,700,568 B2
(45) Date of Patent: Jun. 30, 2020

(54) STATOR ASSEMBLY WITH STRESS CONTROL STRUCTURES

(71) Applicant: General Electric Company, Schenectady, NY (US)

(72) Inventors: Jeffrey S. Sullivan, Niskayuna, NY (US); Christopher Calebrese, Colonie, NY (US); Qin Chen, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 238 days.

(21) Appl. No.: 15/671,628

(22) Filed: Aug. 8, 2017

(65) Prior Publication Data

US 2019/0052142 A1 Feb. 14, 2019

(51) Int. Cl.
*H02K 3/34* (2006.01)
*H02K 3/40* (2006.01)
(Continued)

(52) U.S. Cl.
CPC .............. *H02K 3/505* (2013.01); *B33Y 80/00* (2014.12); *H02K 3/38* (2013.01); *H02K 3/40* (2013.01);
(Continued)

(58) Field of Classification Search
CPC .. H02K 1/04; H02K 3/32; H02K 3/34; H02K 3/345; H02K 3/38; H02K 3/40;
(Continued)

(56) References Cited

U.S. PATENT DOCUMENTS 3,679,925 A * 7/1972 Fort .................... H02K 3/40
310/196
4,847,450 A 7/1989 Rupprecht
(Continued)

FOREIGN PATENT DOCUMENTS

CN 101179212 A 5/2008
CN 101958585 A 1/2011
(Continued)

OTHER PUBLICATIONS

Liang "Integrated Double Sided Cooling Packaging of Planar SiC Power Modules" IEEE Energy Conversion Congress and Exposition (ECCE); Sep. 2015; 5 pages.
(Continued)

*Primary Examiner* — Nguyen Tran
*Assistant Examiner* — David A. Singh
(74) *Attorney, Agent, or Firm* — The Small Patent Law Group LLC; Philip S. Hof

(57) ABSTRACT

An electrical machine includes a stator assembly having an annular core and a conductive winding. The annular core includes a central bore. The conductive winding includes one or more stator winding bars disposed circumferentially around the central bore. The one or more stator winding bars include a core conductor and an insulation layer surrounding the core conductor. An end segment of the one or more stator winding bars at a connection interface includes a stress control structure surrounding the insulation layer. The stress control structure includes a printed scaffold and a dielectric backfill material. The dielectric backfill material fills pores of the printed scaffold. The porous scaffold is composed of a stress control material that is different from the dielectric backfill material.

15 Claims, 4 Drawing Sheets

(51) Int. Cl.
  *H02K 3/50* (2006.01)
  *H02K 15/10* (2006.01)
  *H02K 3/38* (2006.01)
  *B33Y 80/00* (2015.01)
  *H02K 5/04* (2006.01)
  *H02K 5/02* (2006.01)

(52) U.S. Cl.
  CPC ............... *H02K 5/02* (2013.01); *H02K 5/04* (2013.01); *H02K 15/10* (2013.01); *H02K 3/345* (2013.01); *H02K 15/105* (2013.01)

(58) Field of Classification Search
  CPC ............ H02K 3/42; H02K 3/50; H02K 3/505; H02K 5/02; H02K 5/04; H02K 15/10; H02K 15/105; H02K 15/12; H02K 15/0414; H02K 15/064; B29C 64/112; B29C 70/68; B29C 70/88; B33Y 80/00; Y10T 29/49009
  USPC .... 310/43, 45, 194, 196, 214, 260; 264/129, 264/259, 308
  See application file for complete search history.

(56) References Cited

U.S. PATENT DOCUMENTS

| | | | |
|---|---|---|---|
| 6,242,825 B1* | 6/2001 | Mori | H02K 3/30 174/127 |
| 9,230,726 B1 | 1/2016 | Parker et al. | |
| 2004/0012294 A1* | 1/2004 | Rippel | H02K 1/20 310/60 A |
| 2004/0182596 A1* | 9/2004 | Sedlak | H01F 27/323 174/120 R |
| 2005/0088053 A1* | 4/2005 | Kogan | H02K 3/38 310/196 |
| 2006/0280873 A1* | 12/2006 | Smith | H02K 3/40 427/372.2 |
| 2007/0026221 A1* | 2/2007 | Stevens | C09K 5/14 428/325 |
| 2007/0114704 A1* | 5/2007 | Stevens | D21H 13/44 264/643 |
| 2008/0284262 A1* | 11/2008 | Nelson | C08J 5/10 310/52 |
| 2009/0174278 A1* | 7/2009 | Sheaffer | H02K 3/30 310/201 |
| 2011/0012467 A1* | 1/2011 | Blissenbach | H02K 3/28 310/195 |
| 2012/0003086 A1 | 1/2012 | Morris et al. | |
| 2012/0279175 A1 | 11/2012 | Biggs et al. | |
| 2013/0221790 A1* | 8/2013 | Reid | H02K 3/40 310/196 |
| 2014/0265748 A1* | 9/2014 | Clendenen | H02K 11/33 310/68 R |
| 2015/0101838 A1 | 4/2015 | Shepard et al. | |
| 2016/0339542 A1 | 11/2016 | Paetz | |
| 2017/0033634 A1* | 2/2017 | Nikrandt | H02K 15/12 |
| 2017/0250008 A1* | 8/2017 | Somasiri | H01B 3/306 |

FOREIGN PATENT DOCUMENTS

| | | |
|---|---|---|
| CN | 103457380 A | 12/2013 |
| WO | 2016077250 A1 | 5/2016 |

OTHER PUBLICATIONS

Robinson et al. "A New Hybrid Heat Sink with Impinging Micro-Jet Arrays and Micro-Channels Fabricated using High Volume Additive Manufacturing" 33rd Thermal Measurement, Modeling and Management Symposium (SEMI-THERM) Mar. 2017.

Shen et al. "Electric Stress Grading of Composite Bushings using High Dielectric Constant Silicone Compositions" IEEE International Symposium on Electrical Insulation; Oct. 2004.

Office Action for corresponding CN Application No. 201810897876.9 dated Jan. 17, 2020 (25 pages).

\* cited by examiner

STATOR ASSEMBLY WITH STRESS CONTROL STRUCTURES

FIELD

The subject matter described herein relates to electrical machines that have stator assemblies, such as generators and motors.

BACKGROUND

In high voltage electrical cables and machines, insulation breakdown is a concern at locations where the electrical potential across the insulation is high, such as at connection interfaces and areas where the insulation is surrounded by air. For example, corona discharge is an electrical discharge caused by the ionization of a gas, such as air, surrounding a conductor. Corona discharge occurs when the local electric field exceeds a threshold value. The threshold value is dependent on various conditions, such as distances between conductive elements separated by the gas and the electric field strength (e.g., the magnitude of the potential gradient), and the electrical breakdown strength of the fluid. Corona discharge can degrade the insulation layer, reducing the usable lifetime of the insulation layer, and can also generate ozone that is detrimental to the environment.

Stress control structures can be used to control the electrical field within electrically insulating structures as well as on free surfaces, reducing the risk of insulation degradation and breakdown. For example, conventional stress control for rotating machines is accomplished by wrapping insulation in one or more tapes of various conducing and non-linear electrical properties. However, taping has several inherent disadvantages. One issue with tapes is the risk of creating air pockets between adjacent layers of tape, as the air can result in corona discharge. Another issue with tapes is the difficulty in accurately controlling the geometrical structure and the electrical properties of the resulting stress control structure because of generally imprecise wrapping processes used to apply the tape and/or generally imprecise manufacturing processes to produce the tape. Therefore, it may be difficult to optimally control the electrical field concentration using conventional stress control techniques.

SUMMARY

In one or more embodiments, an electrical machine is provided that includes a stator assembly having an annular core and a conductive winding. The annular core includes a central bore elongated between a first face and an opposite, second face of the annular core. The conductive winding includes one or more stator winding bars held on the annular core and disposed circumferentially around the central bore. The one or more stator winding bars include a core conductor and an insulation layer surrounding the core conductor. An end segment of the one or more stator winding bars at a connection interface includes a stress control structure surrounding the insulation layer. The stress control structure includes a printed scaffold and a dielectric backfill material. The printed scaffold includes pores, and the dielectric backfill material fills the pores. The porous scaffold is composed of a stress control material that is different from the dielectric backfill material.

In one or more embodiments, a method is provided that includes producing a printed scaffold via an additive manufacturing process. The printed scaffold includes pores. The printed scaffold includes an insulation section and a stress control section that at least partially surrounds the insulation section. The stress control section of the printed scaffold is composed of a stress control material, and the insulation section is composed of a dielectric insulation material that is different from the stress control material. The method also includes surrounding a core conductor with the printed scaffold at an end segment of the core conductor such that at least a portion of the insulation section is disposed between the core conductor and the stress control section. The method also includes infiltrating the printed scaffold with a dielectric backfill material that fills the pores. The dielectric backfill material is different from the stress control material.

In one or more embodiments, an electrical machine is provided that includes a stator assembly having an annular core and a conductive winding. The annular core includes a central bore elongated between a first face and an opposite, second face of the annular core. The conductive winding includes one or more stator winding bars held on the annular core and disposed circumferentially around the central bore. The one or more stator winding bars includes a core conductor and an insulation layer surrounding the core conductor. An end segment of the one or more stator winding bars at a connection interface includes a stress control structure surrounding the insulation layer. The stress control structure and the insulation layer are defined by a printed scaffold and a dielectric backfill material. The printed scaffold includes pores, and the dielectric backfill material fills the pores. The porous scaffold includes a stress control material along the stress control structure and includes a dielectric insulation material along the insulation layer. The stress control material is different from the dielectric backfill material and the dielectric insulation material.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
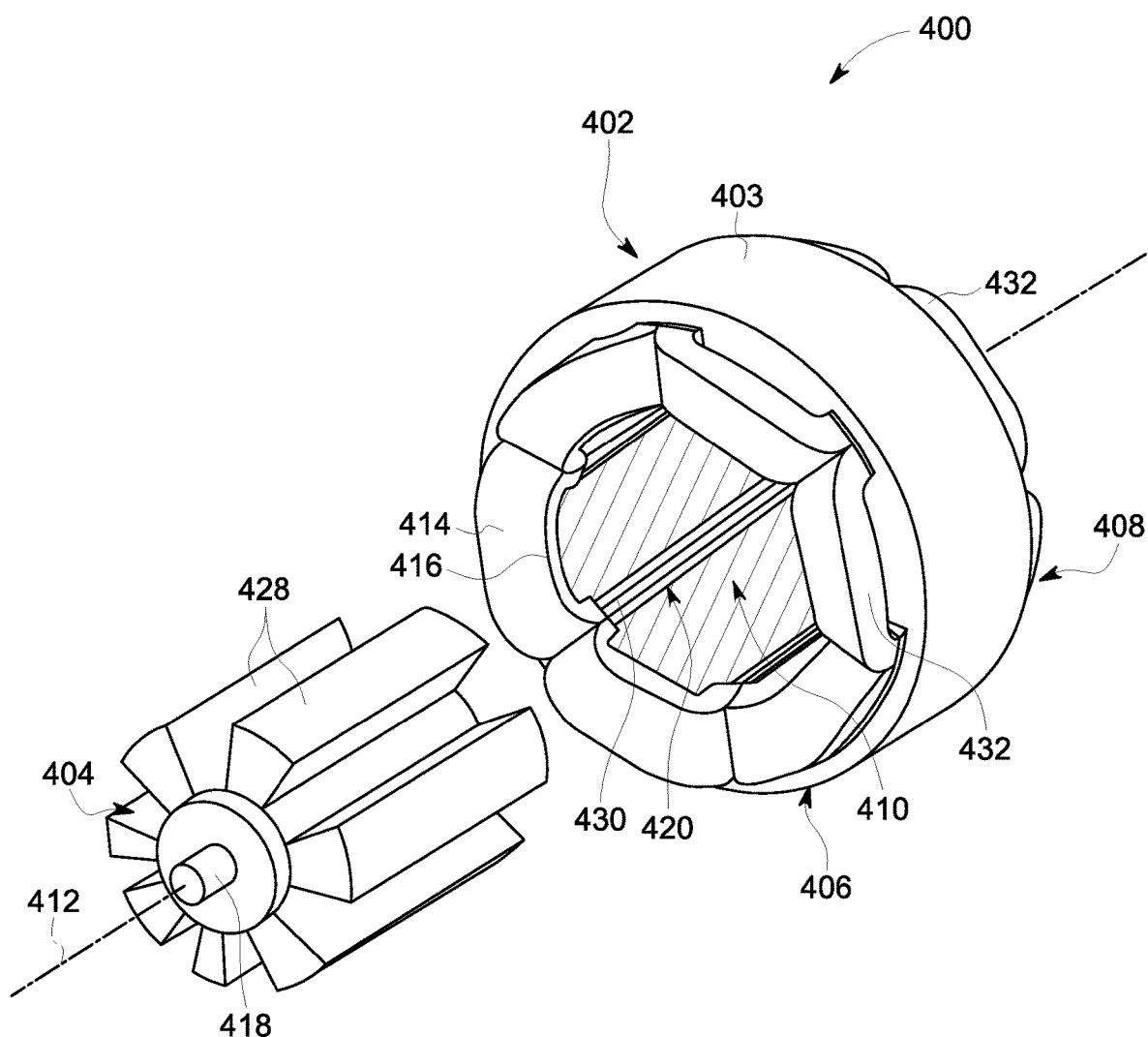
FIG. 1 is an exploded perspective view of an electrical machine according to an embodiment.

Embodiments of the inventive subject matter described herein provide an electrical machine that is configured to operate at high voltages and optionally at high altitudes while suppressing insulation degradation and breakdown. The electrical machine may be a generator or a motor. The electrical machine includes a stator assembly having an annular core and a stator winding. The electrical machine in the embodiments described herein may be able to operate at high voltages exceeding 300 V, such as up to or exceeding 1 kV.

In one or more embodiments of the present disclosure, the stator winding of the electrical machine includes an additively-manufactured printed scaffold that is filled by a dielectric backfill material. The printed scaffold is additively-manufactured via a 3D printing machine. The printed scaffold defines a stress control structure of the stator winding at an end segment of the stator winding. As used herein, stress control structure refers to both materials and structures that are used to control electrical field concentrations within electrically insulating structures and on free surfaces. The stress control structure may have various electrical properties, such as linear conductivity, non-linear conductivity, linear permittivity, and/or non-linear permittivity, and various geometries. Stress control structures, as used herein, may include but are not limited to non-linear stress grading materials. The end segment of the stator winding may be a section that protrudes from a slot of the annular core and/or a section located at a connection interface between two segments of the stator winding (or between an end of the stator winding and a mating cable). The stress control structure is formed to control the electrical field concentration to reduce the risk of insulation breakdown.

The printed scaffold of the stress control structure surrounds an insulation layer of the stator winding. The printed scaffold of the stress control structure may be formed in-situ on an outer surface of the insulation layer or a conductive shield layer of the stator winding. Alternatively, the printed scaffold may be formed remote from the stator winding as a sleeve or tube that is subsequently loaded onto the stator winding. Additively-manufacturing the printed scaffold of the stress control structure allows for more precise control of electrical properties and geometric properties of the stress control structure than conventional tapes.

The printed scaffold is porous as a result of the additive manufacturing process. However, air within the pores of the printed scaffold is eliminated by filling the pores of the scaffold with the dielectric backfill material. The pore size and pore size distribution in the printed scaffold may be uniform or non-uniform along a dimension of the printed scaffold to control the electric field distribution. Selecting the pore sizes and distribution of varying pore sizes along the printed scaffold can be used to control the electric field distribution in addition to controlling the overall shape of the stress control structure and the materials of the stress control structure. The dielectric backfill material is impregnated into the printed scaffold under pressure and then baking the resulting combination. For example, the impregnation may be accomplished using vacuum pressure impregnation (VPI) or a similar process. The printed scaffold of the stress control structure is composed of a stress control material that differs from the dielectric backfill material. Non-limiting examples of stress control materials include nonlinear composite (SiC, ZnO filled) materials and/or high permittivity materials. The printed scaffold is a connected three-dimensional web or matrix, so the stress control structure may exhibit the electric properties of the stress control material, even after infiltration by the dielectric backfill material. Forming the scaffold via printing allows for material property selection as well as shape selection, such that the printed scaffold may have a non-linear shape that would be difficult to achieve using conventional stress control tapes and the like.

Optionally, the stress control structure is not the only component of the stator winding that includes a printed scaffold infiltrated by the dielectric backfill material. For example, the insulation layer and/or the conductive shield layer of the stator winding may also be formed by an additively-manufactured printed scaffold backfilled by the dielectric backfill material. The printed scaffold may include a portion composed of a dielectric insulation material to define the insulation layer that surrounds a core conductor of the stator winding, and another portion composed of the stress control material to define the stress control structure.

At least one technical effect of the subject matter described herein includes providing a stator assembly with a stress control structure that reduces the degradation of electrical insulation by preventing corona discharge, and therefore extends the lifetime of the stator assembly. Furthermore, the stress control structures described herein may allow the electrical machine to operate at higher voltages and/or higher altitudes than conventional stator assemblies, by allowing size-optimized design while reducing the risk of corona discharge across the insulation. Yet another technical effect of the subject matter described herein includes better electrical stress grading performance than conventional stress grading tapes because the stress control structures described here are additively-manufactured using 3D printing, which allows more precise control of shapes, sizes, and materials for the stress control structures than tape.

FIG. 1 is an exploded perspective view of an electrical machine 400 according to an embodiment. The electrical machine 400 may be a generator or a motor. The electrical machine 400 includes a stator assembly 402 and a rotor 404, which are substantially concentric. The electrical machine 400 optionally may be configured for use on an aircraft, in an industrial plant, or the like.

The stator assembly 402 includes an annular core 403 that defines a central bore 410. The annular core 403 has a first face 406 and an opposite, second face 408. The central bore 410 extends through the core 403 between the first and second faces 406, 408. The central bore 410 is elongated along a longitudinal axis 412 of the stator assembly 402. The core 403 optionally defines slots 420 that extend parallel to the longitudinal axis 412. The slots 420 are disposed radially outside of the central bore 410, although may be fluidly connected to the bore 410.

Figure 2:
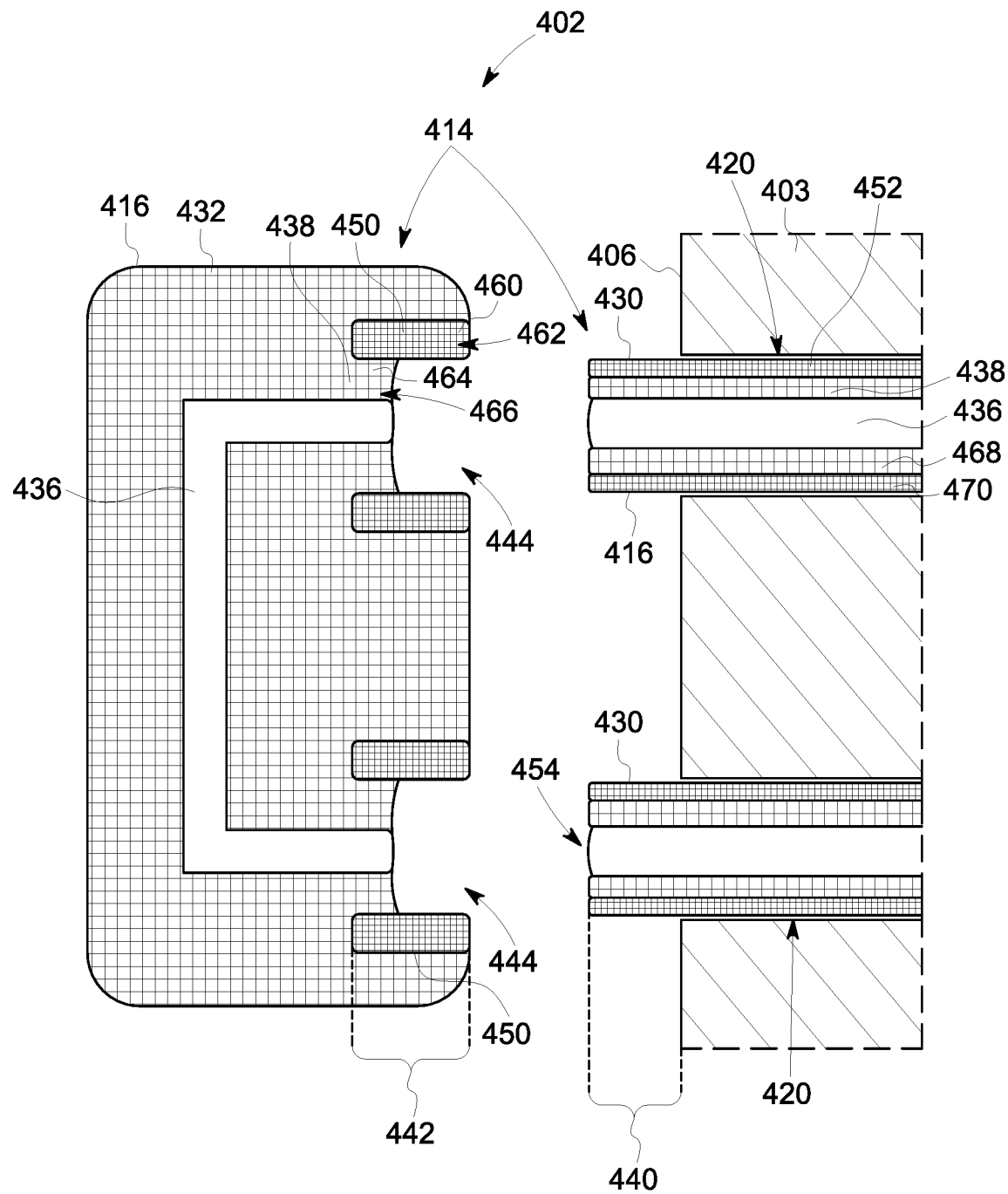
FIG. 2 is a cross-sectional illustration of one end-winding bars of a stator assembly of the electrical machine poised for coupling to two intra-core bars of the stator assembly according to an embodiment.

The stator assembly 402 includes a conductive winding 414 held on the core 403. The conductive winding 414 includes one or more stator winding bars 416 disposed circumferentially around the central bore 410. Each of the stator winding bars 416 includes a core conductor 436 (shown in FIG. 2) surrounded by an insulation layer 438 (FIG. 2). In the illustrated embodiment, the conductive winding 414 includes multiple interconnected stator winding bars 416. The stator winding bars 416 include intra-core bars 430 and end-winding bars (or caps) 432. The intra-core bars 430 extend through the annular core 403 between the first and second faces 406, 408. Optionally, end segments of the intra-core bars 430 may protrude beyond the first face 406 and/or the second face 408. The intra-core bars 430 may be held within the slots 420 of the core 403. The end-winding bars 432 are disposed outside of the annular core 403, and are configured to electrically connect to the intra-core bars 430 to form a conductive circuit path that winds through the annular core 403 circumferentially around the central bore 410. For example, each end-winding bar 432 may form a conductive bridge that electrically connects two adjacent intra-core bars 430 together. In an alternative embodiment, the conductive winding 414 includes a single stator winding bar 416 that is continuously wound around the annular core 403, instead of multiple interconnected bar segments. Although not shown in FIG. 1, the conductive winding 414 has electrical connectors that are used for electrically connecting the conductive winding 414 to external electrical devices outside of the electrical machine 400, such as batteries, alternators, power converters, circuit breakers, electrical loads, or the like.

When the electrical machine 400 is assembled, the rotor 404 is received and held within the central bore 410 of the stator assembly 402. The rotor 404 is coupled to a shaft 418 that extends along the longitudinal axis 412 of the stator assembly 402. The rotor 404 and the shaft 418 are configured to rotate together relative to the stator assembly 402 around (or about) the longitudinal axis 412. The rotor 404 includes rotor teeth 428 disposed along a circumference of the rotor 404.

The electrical machine 400 may include one or more permanent magnets on the stator assembly 402 and/or on the rotor 404. For example, the rotor teeth 428 may include or represent permanent magnets. Alternatively, the stator assembly 402 may include permanent magnets mounted on the annular core 403.

During operation of the electrical machine 400, the shaft 418 and the rotor 404 rotate around the longitudinal axis 412 relative to the stator assembly 402. Depending on whether the electrical machine 400 is a generator or a motor, electric current in the conductive winding 414 is either induced by, or causes, the rotation of the rotor 404. For example, if the electrical machine 400 is a generator, work done on the shaft 418 rotates the rotor 404, inducing electric current flow in the conductive winding 414 which can power an electrical load (e.g., lighting systems, air-conditioning, electrical and computing systems, etc.). If, on the other hand, the electrical machine 400 is a motor, current supplied through the conductive winding 414 induces a magnetic field that rotates the rotor 404 and the shaft 418. The rotation of the shaft 418 can be used to power a mechanical load (e.g., turning a propeller, driving rotation of wheels of a vehicle, etc.).

FIG. 2 is a cross-sectional illustration of one of the end-winding bars 432 of the stator assembly 402 poised for coupling to two intra-core bars 430 of the stator assembly 402 according to an embodiment. In the illustrated embodiment, the two intra-core bars 430 are disposed in corresponding slots 420 of the annular core 403, and each protrudes beyond the first face 406 of the core 403. Although not shown in FIG. 2, the intra-core bars 430 may also protrude beyond the second face 408 (shown in FIG. 1) of the core 403 for electrically connecting to other end-winding bars 432 of the conductive winding 414.

The stator winding bars 416 of the stator assembly 402, including the end-winding bars 432 and the intra-core bars 430, include a core conductor 436 that is surrounded by an insulation layer 438. The core conductor 436 is composed of one or more metals, such as copper, silver, or the like. In an embodiment, the core conductor 436 is configured to convey high voltage electric current, such as voltage up to or exceeding 1 kV. The insulation layer 438 is composed of one or more dielectric materials, such as ceramics, polymers, or polymer composites. In the end-winding bar 432, the insulation layer 438 is a housing that structurally supports the end-winding bar 432 as well as providing electrical insulation for the conductor 436.

In the illustrated embodiment, the intra-core bars 430 also include a conductive shield layer 452 that surrounds the insulation layer 438. The conductive shield layer 452 is disposed between the insulation layer 438 and the walls of the annular core 403 that define the slots 420. The conductive shield layer 452 is composed of one or more metals or conductive, particle-filled polymers, and is configured to electrically connect to the electrically-grounded core 403 within the slot 420. The conductivity of the conductive shield layer 452 may be within a range from about $10^{-3}$ S/m to about $10^3$ S/m. Optionally, the conductive shield layer 452 protrudes beyond the first face 406 of the core 403 to a distal end 454 of the respective intra-core bar 430, such that the conductive shield layer 452 surrounds the insulation layer 438 along the end segment 440.

End segments 440 of the intra-core bars 430 are configured to mechanically couple and electrically connect to an end segment 442 of the end-winding bar 432 to establish a closed circuit path along the core conductors 436 of the intra-core bars 430 and the end-winding bar 432. For example, an intra-core bar 430 may be electrically connected to an end segment 442 via a plug-and-socket-type connection, brazing, welding, or the like. In the illustrated embodiment, the end segments 440 of the intra-core bars 430 protrude from the annular core 403 beyond the first face 406 to engage the end-winding bar 432 outside of the annular core 403. The end-winding bar 432 defines two cavities 444 that are each sized to receive the end segment 440 of a different one of the intra-core bars 430 therein. In one or more embodiments, the insulation layer 438 of at least one of the end segment 440 of the intra-core bar 430 or the end segment 442 of the end-winding bar 432 is surrounded by a stress control structure 450. For example, a first portion of the respective insulation layer 438 may be radially disposed between the core conductor 436 and the stress control structure 450, and optionally a second portion of the insulation layer 438 may surround the stress control structure 450 (such that the stress control structure 450 is between the two portions of insulation). In the illustrated embodiment, the end-winding bar 432 includes stress control structures 450 at each of the two cavities 444, and the intra-core bars 430 do not include stress control structures 450. But, in alternative embodiments, such as FIG. 4, the intra-core bars 430 include stress control structures 450 at the end segments 440.

The stress control structures 450 are configured to distribute the voltage gradient (or dielectric stress) between the core conductor 436 and the air surrounding the stator assembly 402 relative to having only one type of dielectric material (e.g., the insulation layer 438) between the conductor 436 and the air. In one embodiment, the stress control structures 450 provide capacitance grading. The stress control structures 450 are composed of a dielectric material (referred to as a dielectric stress control material) that has a permittivity (or dielectric constant) that is different than the permittivity of the dielectric insulation material that forms the insulation layer 438. For example, the permittivity of the dielectric stress control material may have a permittivity that is less than the permittivity of the dielectric insulation material located between the stress control structure 450 and the conductor 436. In another embodiment, the stress control structures 450 may provide inter-sheath grading, such that the stress control structures 450 are composed of a conductive material. The conductive stress control structures 450 represent mechanical inter-sheaths located between portions of the homogenous insulation layer 438. The stress control structures 450 function to reduce the risk of corona discharge (e.g., electrical breakdown) across the insulation layer 438, by distributing the voltage gradient to reduce the electric field concentration at any one location of the insulation layer 438.

Although shown in FIG. 2 as having rectangular cross-sections, the stress control structures 450 may be annular such that each stress control structure 450 surrounds an entire circumference of the conductor 436 and the insulation layer 438.

In an embodiment, the stress control structures 450 include a printed scaffold 460 that is additively manufactured. For example, the printed scaffold 460 of each stress control structure 450 is formed by the successive addition of material, layer by layer, under computer control by a 3D printer or a similar machine. The resulting printed scaffold 460 resembles a web or matrix that includes pores 462. In an embodiment, the printed scaffold 460 is formed to include pores 462 that are larger than the pores in at least some convention additively-manufactured products. For example, the pore sizes of the printed scaffold 460 may be 100-1000 micrometers (μall). The pores are sized to allow a dielectric backfill material, such as a polymer resin, to be infiltrated or impregnated into the printed scaffold 460 to fill the pores 462, as described in more detail below with reference to FIG. 3. Optionally, the pore sizes may intentionally vary along a dimension (e.g., height, length, and/or width) of the printed scaffold 460 to provide non-linear electrical properties along the dimension. For example, the pore sizes may be between about 300 μm to about 500 μm in one area of the printed scaffold 460, and the pore sizes in a different area may be between about 500 μm and about 700 μm. The printed scaffold 460 is composed of one or more stress control materials.

In the illustrated embodiment, the insulation layer 438 of the end-winding bar 432 also includes a printed scaffold 464 that is additively manufactured. The printed scaffold 464 of the insulation layer 438 is composed of the dielectric insulation material. The printed scaffold 464 may be structurally similar to the printed scaffold 460 of the stress control structures 450. For example, the printed scaffold 464 of the insulation layer 438 is porous with pores 466 having a similar or the same size as the pores 462 of the stress control structures 450. Optionally, the printed scaffold 464 of the insulation layer 438 is formed via the same additively-manufacturing process by the same 3D printing machine as the printed scaffold 460 of the stress control structures 450. For example, the printed scaffold 464 may be integrally-formed with the printed scaffold 460 during a single manufacturing process, with the 3D printing machine merely switching the printing materials to differentiate the printed scaffold 464 from the printed scaffold 460. The printed scaffold 464 of the insulation layer 438 may be formed in-situ by printing directly onto the core conductor 436. Alternatively, the printed scaffold 464 can be printed as a hollow tube that receives the core conductor 436 therein after the printed scaffold 464 is formed.

In an alternative embodiment, the printed scaffolds 460, 464 are formed during separate additive manufacturing processes and are subsequently coupled together via an adhesive or the like. For example, the printed scaffold 460 of the stress control structures 450 may be formed as a discrete tube or sleeve that is loaded into corresponding grooves in the insulation layer 438 of the end-winding bar 432 during assembly of the end-winding bar 432. In another alternative embodiment, the insulation layer 438 of the end-winding bar 432 does not include the printed scaffold 464, but rather includes a molded body of one or more plastics or other polymers.

In the illustrated embodiment, the insulation layer 438 and the conductive shield layer 452 of the intra-core bars 430 also include respective printed scaffolds 468, 470 that are additively manufactured. The insulation printed scaffold 468 of the intra-core bar 430 may be the same as the insulation printed scaffold 464 of the end-winding bar 432. The shield printed scaffold 470 is composed of one or more metals. The insulation printed scaffold 468 optionally may be formed during the same additive manufacturing process as the shield printed scaffold 470. For example, the 3D printing machine may print successive sheets or layers of the dielectric insulation material to produce the insulation printed scaffold 468, and subsequently may print multiple successive sheets or layers of the conductive material to produce the shield printed scaffold 470 directly on the insulation scaffold 468. Alternatively, the insulation printed scaffold 468 is formed separately from the shield printed scaffold 470. In another alternative embodiment, the insulation layer 438 and/or the conductive shield layer 452 of the intra-core bars 430 do not include the printed scaffolds 468, 470, but rather have conventional structures. For example, the conductive shield layer 452 may be a tape or a paint-like liquid substance that is applied on the insulation layer 438.

Figure 3:
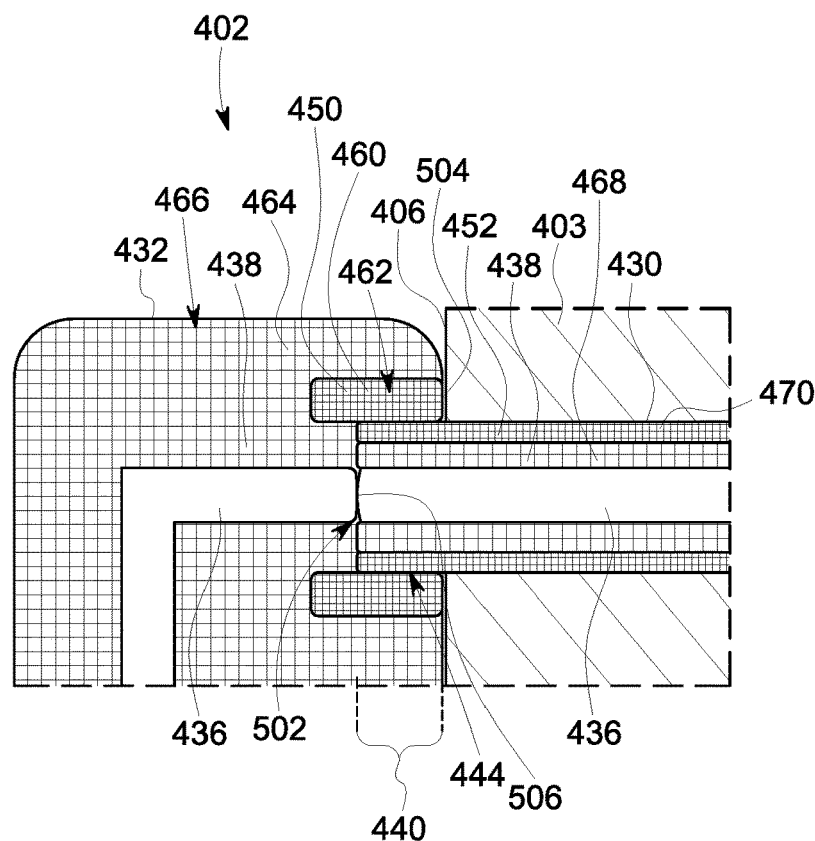
FIG. 3 is a cross-sectional illustration of a portion of the stator assembly in an assembled state according to an embodiment.

During assembly of the stator assembly 402, the end-winding bar 432 is coupled to the intra-core bars 430 such that the end segments 440 are received in the corresponding cavities 444 of the end-winding bar 432, as shown in FIG. 3.

FIG. 3 is a cross-sectional illustration of a portion of the stator assembly 402 in an assembled state according to an embodiment. The end segment 440 of the illustrated intra-core bar 430 is received within the cavity 444 of the end-winding bar 432 to define a connection interface 502 between the intra-core bar 430 and the end-winding bar 432. The core conductor 436 of the intra-core bar 430 mechanically engages and electrically connects to the core conductor 436 of the end-winding bar 432 at the connection interface 502. A mating side 504 of the end-winding bar 432 may abut the first face 406 of the annular core 403. The stress control structure 450 surrounds the insulation layers 438 and the conductors 436 of both the end-winding bar 432 and the intra-core bar 430 along the connection interface 502. For example, the stress control structure 450 extends beyond a distal end 506 of the core conductor 436 of the end-winding bar 432 across the connection interface 502 between the two core conductors 436. As shown in FIG. 3, the stress control structure 450 optionally also surrounds the conductive shield layer 452 of the intra-core bar 430 when the stator assembly 402 is assembled.

In one or more embodiments, after the hardware components of the stator assembly 402 are loaded and mechanically mated together, a dielectric backfill material is applied into the one or more printed scaffolds to fill in the pores. For example, the entire stator assembly 402 may be immersed in the liquid-phase dielectric backfill material, then subsequently removed and cured. The backfill material is infiltrated into the printed scaffolds to eliminate air pockets within the printed scaffolds, rendering the printed scaffolds void-free. The backfill material is received in the pores 462 of the printed scaffold 460 of the stress control structure 450. The backfill material is electrically insulative, and may be a polymer resin. In an embodiment, the backfill material does not substantially affect the electrical properties of the printed scaffold 460, but rather merely fills the voids between scaffold walls. The backfill material is different from the stress control material of the stress control structure 450, such that the backfill material has different electrical properties than the stress control material. For example, the backfill material may have a greater permittivity and lower conductivity than the stress control material in one embodiment, and the backfill material may have a lower permittivity and a greater conductivity than the stress control material in another embodiment.

The backfill material is also received in the pores 466 of the insulation printed scaffold 464 of the end-winding bar 432 as well as in pores of the insulation printed scaffold 468 of the intra-core bar 430 and the shield printed scaffold 470 of the conductive shield layer 452. The backfill material optionally is a different material than the insulation material that forms the insulation printed scaffolds 464, 468. For example, in one embodiment, the insulation printed scaffolds 464, 468 are composed of a ceramic, while the backfill material is a polymer resin. Alternatively, the insulation printed scaffolds 464, 468 may be composed of a polymer that is different from the polymer resin of the backfill material.

The dielectric backfill material may be applied into the porous printed scaffolds 460, 464, 468, 470 by a pressure-controlled process. In one embodiment, vacuum pressure impregnation (VPI) is the process used to infiltrate the pores with the backfill material. For example, the stator assembly 402 may be placed in a vacuum tank, and then the backfill material is pumped into the tank under pressure. The backfill material is drawn into the pores in the printed scaffolds 460, 464, 468, 470 and other voids in the stator assembly 402. The backfill material may entirely fill the pores to eliminate air pockets. Then, the stator assembly 402 is baked to bond all of the components together as a single, integral stator body that is configured to couple to the rotor 404 (shown in FIG. 1). The backfill material solidifies during the baking process, resulting in solid composite structures for the stress control structure 450, the insulation layer 438, and the conductive shield layer 452. By impregnating the printed scaffolds 460, 464, 468, 470 with the backfill material, the backfill material substantially eliminates air within the printed scaffolds 460, 464, 468, 470, which significantly reduces the risk of electrical breakdown, without affecting the electrical properties of the scaffolds 460, 464, 468, 470. For example, the conductive shield layer 452 remains electrically conductive even after infiltration of the dielectric backfill material.

Figure 4:
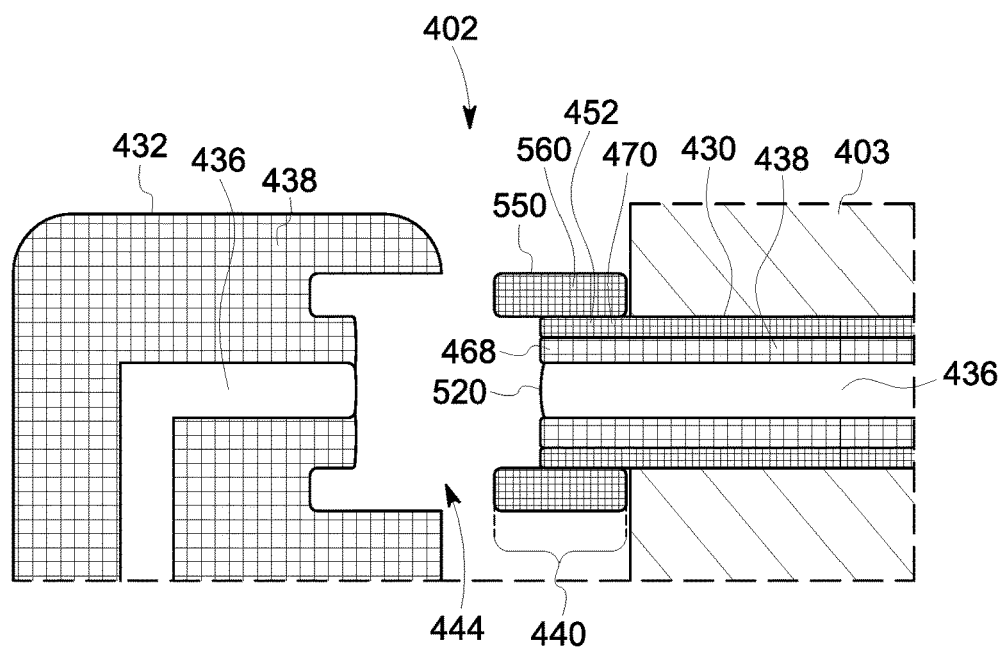
FIG. 4 is a cross-sectional illustration of a portion of one of the end-winding bars of the stator assembly poised for coupling to an intra-core bar of the stator assembly according to an alternative embodiment.

FIG. 4 is a cross-sectional illustration of a portion of one of the end-winding bars 432 of the stator assembly 402 poised for coupling to an intra-core bar 430 of the stator assembly 402 according to an alternative embodiment. In the illustrated embodiment, the intra-core bar 430 includes a stress control structure 550 that is disposed on the end segment 440. The stress control structure 550 may be similar in shape and material properties as the stress control structure 450 shown in FIGS. 2 and 3. For example, the stress control structure 550 surrounds the conductive shield layer 452 outside of the annular core 403. The conductive shield layer 452 is located between the stress control structure 550 and the insulation layer 438 of the intra-core bar 430. A printed scaffold 560 of the stress control structure 550 may be printed directly on the conductive shield layer 452. For example, the printed scaffold 560 of the stress control structure 550, the shield printed scaffold 470, and the insulation printed scaffold 468 may be integrally-formed during a single manufacturing process, with the 3D printing machine switching the printing materials to differentiate the scaffolds 560, 468, 470. In an alternative embodiment, the printed scaffold 560 of the stress control structure 550 may be printed during a discrete manufacturing process into a tube or sleeve that is subsequently loaded onto the end segment 440 of the intra-core bar 430.

The end-winding bar 432 in the illustrated embodiment includes the insulation layer 438 that surrounds the core conductor 436, but lacks the stress control structure 450 that is shown in FIGS. 2 and 3. When the end segment 440 of the intra-core bar 430 is received into the cavity 444, the stress control structure 550 of the intra-core bar 430 protrudes beyond a distal end 520 of the core conductor 436 thereof across the connection interface that is formed between the two mating core conductors 436.

In an alternative embodiment, both the end-winding bar 432 and the intra-core bar 430 include stress control structures. For example, the stress control structure of the end-winding bar 432 may abut and engage the stress control structure of the intra-core bar 430 to provide stress control across the connection interface. Alternatively, the stress control structures may overlap one another across the connection interface without engaging each other.

Figure 5:
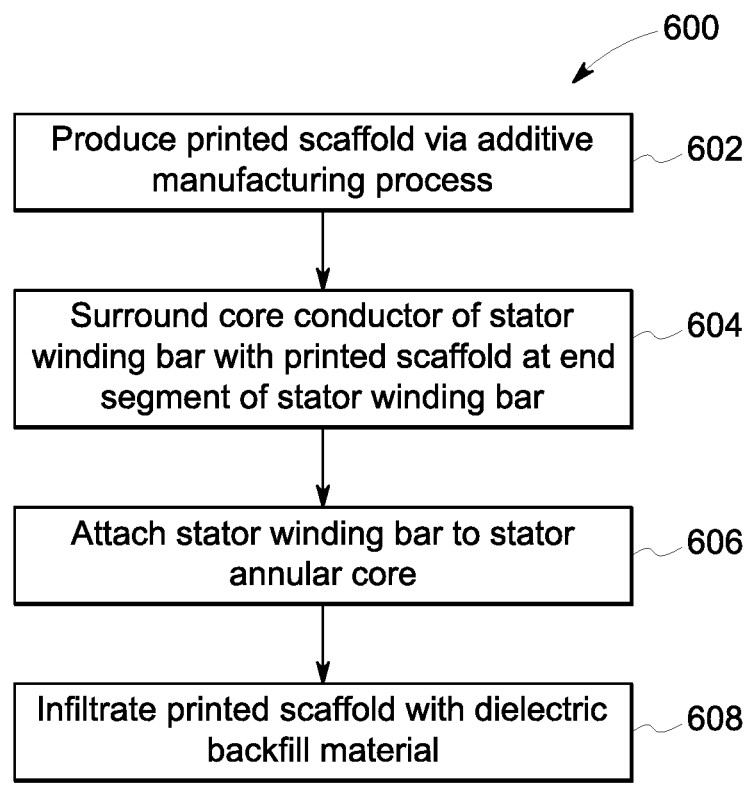
FIG. 5 is a flow chart of a method of assembling a stator assembly for an electrical machine according to an embodiment.

FIG. 5 is a flow chart of a method 600 of assembling a stator assembly for an electrical machine according to an embodiment. The stator assembly may be the stator assembly 402 shown in any of the FIGS. 1-4. The electrical machine may be a generator or a motor. At 602, a printed scaffold is produced via an additive manufacturing process. The printed scaffold is formed under computer control by a 3D printing machine. The printed scaffold includes pores that result from the additive manufacturing process. The pores may have a size between about 100 and about 1000 µm. The printed scaffold includes an insulation section and a stress control section. The stress control section at least partially surrounds the insulation section. The stress control section is composed of a stress control material, and the insulation section is composed of a dielectric insulation material that is different from the stress control material. For example, the insulation material may have a greater permittivity or dielectric constant than the stress control material. Alternatively, the insulation material may have a lower permittivity or dielectric constant than the stress control material. The stress control section and the insulation section of the printed scaffold may be formed during a single manufacturing process by switching the materials that are deposited by the printing machine. Alternatively, the stress control section may be formed by a different additive manufacturing process than the insulation section, and the two sections are subsequently attached together via an adhesive or the like.

At 604, a core conductor of a stator winding bar is surrounded with the printed scaffold at an end segment of the stator winding bar. The printed scaffold surrounds the core conductor such that at least a portion of the insulation section is disposed between the core conductor and the stress control section. Optionally, the printed scaffold is produced in-situ on the core conductor of the stator winding bar. For example, the 3D printing machine deposits successive layers of the insulation material and the stress control material directly onto the core conductor. Alternatively, the printed scaffold is produced in the form of a hollow tube in a separate location from the core conductor of the stator winding bar. The core conductor is then surrounded with the printed scaffold by inserting the stator winding bar into the hollow tube such that the core conductor is within the tube. Optionally, a portion of the printed scaffold may extend beyond a distal end of the core conductor. For example, the stress control section may extend beyond the distal end of the core conductor in order to extend across a connection interface between the stator winding bar and a connecting stator winding bar.

At 606, the stator winding bar is attached to a stator annular core that includes a central bore extending through the annular core. The stator winding bar is attached to the annular core such that the printed scaffold at the end section is outside of the central bore. The stator winding bar may be an intra-core bar that extends through the annular core or an end-winding bar that is disposed entirely outside of the annular core. The end-winding bars interconnect intra-core bars to provide a continuous conductive path around the stator core. Thus, the stator winding bar may be attached to the annular core by inserting the bar into a slot through the core (for an intra-core bar), or by coupling the stator winding bar to the ends of two adjacent intra-core bars (for an end-winding bar).

At 608, the printed scaffold is infiltrated (or impregnated) with a dielectric backfill material that fills the pores of the printed scaffold. The dielectric backfill material is different from the stress control material of the stress control section of the scaffold. The backfill material may be a polymer, such as an epoxy resin. The backfill material fills the pores to entirely, or at least substantially, eliminate air-filled voids within the printed scaffold that could lead to partial discharge across within insulation. In an embodiment, the dielectric backfill material is infiltrated into the pores of the printed scaffold subsequent to attaching the stator winding bar to the annular core. For example, the stator assembly may be mechanically assembled to form a unitary stator body, and the stator body may be immersed into the backfill material in a liquid phase under pressure. Thus, both the stator winding bar and the annular core may be immersed in the dielectric backfill material. The pressure forces or draws the backfill material into the pores in the printed scaffold as well as into other voids in the stator body to reduce air pockets. For example, a VPI process may be used to fill the pores of the printed scaffold with the dielectric backfill material. The stator assembly may be subsequently heated (e.g., baked and/or cured) in an oven to solidify the dielectric backfill material, resulting in a solid composite insulation structure and a solid composite stress control structure surrounding the core conductor.

Although the method 600 described above is directed to stator winding bars of a stator assembly, the method 600, or steps thereof, may be applied to other electrical machines, conductors, and connectors. For example, at 604, the printed scaffold may be applied on a core conductor of an electrical connector and/or an electrical cable, instead of a stator winding bar. In such an example, the step 606 of attaching the stator winding bar to the annular core may be omitted. Thus, the process of surrounding a core conductor with an additively-manufactured printed scaffold and subsequently infiltrating pores of the printed scaffold with a dielectric backfill material may also be applied to electrical connectors, cables, and machines other than stator winding bars of stator assemblies.

In an embodiment, an electrical machine is provided that includes a stator assembly having an annular core and a conductive winding. The annular core includes a central bore elongated between a first face and an opposite, second face of the annular core. The conductive winding includes one or more stator winding bars held on the annular core and disposed circumferentially around the central bore. The one or more stator winding bars include a core conductor and an insulation layer surrounding the core conductor. An end segment of the one or more stator winding bars at a connection interface includes a stress control structure surrounding the insulation layer. The stress control structure includes a printed scaffold and a dielectric backfill material. The printed scaffold includes pores, and the dielectric backfill material fills the pores. The porous scaffold is composed of a stress control material that is different from the dielectric backfill material.

Optionally, the dielectric backfill material has a different permittivity than the stress control material of the printed scaffold.

Optionally, the dielectric backfill material fills an entirety of the pores of the printed scaffold to eliminate air pockets within the stress control structure.

Optionally, the insulation layer of the one or more stator winding bars includes a printed scaffold composed of a dielectric insulation material. The printed scaffold of the insulation layer includes pores that are filled by the dielectric backfill material.

Optionally, the end segment includes a conductive shield layer surrounding the insulation layer and disposed between the insulation layer and the stress control structure. Optionally, the conductive shield layer includes a printed scaffold composed of a conductive material. The printed scaffold of the conductive shield layer includes pores that are filled by the dielectric backfill material.

Optionally, the one or more stator winding bars define multiple interconnected stator winding bars including intra-core bars and end-winding bars. The intra-core bars extend through the annular core between the first and second faces. The end-winding bars are disposed outside of the annular core. The end segment of the one or more stator winding bars is at the connection interface between one of the intra-core bars and one of the end-winding bars outside of the annular core. Optionally, the stress control structure at the end segment is disposed on the intra-core bar. Optionally, the stress control structure at the end segment is disposed on the end-winding bar.

Optionally, the end segment of the one or more stator winding bars includes a distal end of the core conductor. The stress control structure extends axially beyond the distal end of the core conductor across the connection interface.

Optionally, the electrical machine further includes a rotor held within the central bore of the annular core. The rotor is coupled to a shaft that extends along a longitudinal axis of the stator assembly. The rotor is configured to rotate relative to the stator assembly around the longitudinal axis.

In an embodiment, a method is provided that includes producing a printed scaffold via an additive manufacturing process. The printed scaffold includes pores. The printed scaffold includes an insulation section and a stress control section that at least partially surrounds the insulation section. The stress control section of the printed scaffold is composed of a stress control material, and the insulation section is composed of a dielectric insulation material that is different from the stress control material. The method also includes surrounding a core conductor with the printed scaffold at an end segment of the core conductor such that at least a portion of the insulation section is disposed between the core conductor and the stress control section. The method includes attaching the stator winding bar to an annular core that includes a central bore extending therethrough. The stator winding bar is attached to the annular core such that the printed scaffold at the end segment is outside of the central bore. The method also includes infiltrating the printed scaffold with a dielectric backfill material that fills the pores. The dielectric backfill material is different from the stress control material.

Optionally, the printed scaffold is produced in the form of a hollow tube, and the core conductor is surrounded with the printed scaffold by inserting the core conductor into the tube.

Optionally, the printed scaffold is produced in-situ on the core conductor.

Optionally, the printed scaffold is infiltrated with the dielectric backfill material via a vacuum pressure impregnation (VPI) process.

Optionally, the core conductors is a component of a stator winding bar, and the method further includes attaching the stator winding bar to an annular core that includes a central bore extending therethrough. The stator winding bar is attached to the annular core such that the printed scaffold is disposed outside of the central bore. Optionally, the dielectric backfill material is infiltrated into the pores of the printed scaffold subsequent to attaching the stator winding bar to the annular core. Both the stator winding bar and the annular core are immersed in the dielectric backfill material.

Optionally, the printed scaffold surrounds the core conductor extends axially beyond a distal end of the core conductor.

In an embodiment, an electrical machine is provided that includes a stator assembly having an annular core and a conductive winding. The annular core includes a central bore elongated between a first face and an opposite, second face of the annular core. The conductive winding includes one or more stator winding bars held on the annular core and disposed circumferentially around the central bore. The one or more stator winding bars includes a core conductor and an insulation layer surrounding the core conductor. An end segment of the one or more stator winding bars at a connection interface includes a stress control structure surrounding the insulation layer. The stress control structure and the insulation layer are defined by a printed scaffold and a dielectric backfill material. The printed scaffold includes pores, and the dielectric backfill material fills the pores. The porous scaffold includes a stress control material along the stress control structure and includes a dielectric insulation material along the insulation layer. The stress control material is different from the dielectric backfill material and the dielectric insulation material.

Optionally, the printed scaffold further defines a conductive shield layer that is disposed between the stress control structure and the insulation layer. The conductive shield layer includes a conductive material. The pores of the printed scaffold along the conductive shield layer are filled by the dielectric backfill material.

Optionally, the dielectric insulation material of the insulation layer is a ceramic, and the dielectric backfill material is a polymer resin.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical machine comprising:
   a stator assembly including an annular core and a conductive winding, the annular core including a central bore elongated between a first face and an opposite, second face of the annular core, the conductive winding including one or more stator winding bars held on the annular core and disposed circumferentially around the central bore, the one or more stator winding bars including a core conductor and an insulation layer surrounding the core conductor, wherein an end segment of the one or more stator winding bars at a connection interface includes a stress control structure surrounding the insulation layer,
   wherein the stress control structure and the insulation layer are defined by a printed scaffold and a dielectric backfill material, the printed scaffold being a three-dimensional web that defines pores, the dielectric backfill material filling the pores, the printed scaffold composed of a stress control material along the stress control structure and composed of a dielectric insulation material along the insulation layer, the stress control material and the dielectric insulation material each being different from the dielectric backfill material and different from each other.

2. The electrical machine of claim 1, wherein the dielectric backfill material has a different permittivity than the stress control material of the printed scaffold.

3. The electrical machine of claim 1, wherein the dielectric backfill material fills an entirety of the pores of the printed scaffold to eliminate air pockets within the stress control structure.

4. The electrical machine of claim 1, wherein the end segment includes a conductive shield layer surrounding the insulation layer and disposed between the insulation layer and the stress control structure.

5. The electrical machine of claim 4, wherein the conductive shield layer is defined by the printed scaffold, the printed scaffold composed of a conductive material along the conductive shield layer, the pores of the printed scaffold along the conductive shield layer filled by the dielectric backfill material.

6. The electrical machine of claim 1, wherein the one or more stator winding bars define multiple interconnected stator winding bars including intra-core bars and end-winding bars, the intra-core bars extending through the annular core between the first and second faces, the end-winding bars disposed outside of the annular core,
   wherein the end segment of the one or more stator winding bars is at the connection interface between one of the intra-core bars and one of the end-winding bars outside of the annular core.

7. The electrical machine of claim 6, wherein the stress control structure at the end segment is disposed on the intra-core bar.

8. The electrical machine of claim 6, wherein the stress control structure at the end segment is disposed on the end-winding bar.

9. The electrical machine of claim 1, wherein the end segment of the one or more stator winding bars includes a distal end of the core conductor, the stress control structure extending axially beyond the distal end of the core conductor across the connection interface.

10. The electrical machine of claim 1, wherein the pores of the printed scaffold have pore sizes no less than 100 micrometers and no greater than 1000 micrometers.

11. The electrical machine of claim 1, wherein the stress control material is integrally connected to the dielectric insulation material at an interface between the stress control structure and the insulation layer.

12. An electrical machine comprising:
   a stator assembly including an annular core and a conductive winding, the annular core including a central bore elongated between a first face and an opposite, second face of the annular core, the conductive winding including one or more stator winding bars held on the annular core and disposed circumferentially around the central bore, the one or more stator winding bars including a core conductor and an insulation layer surrounding the core conductor, wherein an end segment of the one or more stator winding bars at a connection interface includes a stress control structure surrounding the insulation layer, wherein the stress control structure and the insulation layer are defined by a printed scaffold and a dielectric backfill material, the printed scaffold being a three-dimensional web that defines pores, the dielectric backfill material filling the pores, the printed scaffold including a stress control material along the stress control structure and including a dielectric insulation material along the insulation layer, the stress control material being different from the dielectric backfill material and the dielectric insulation material, the stress control material being integrally connected to the dielectric insulation material at an interface between the stress control structure and the insulation layer.

13. The electrical machine of claim 12, wherein the printed scaffold further defines a conductive shield layer that is disposed between the stress control structure and the insulation layer, the conductive shield layer including a conductive material, the pores of the printed scaffold along the conductive shield layer filled by the dielectric backfill material.

14. The electrical machine of claim 12, wherein the dielectric insulation material of the insulation layer is a ceramic, and the dielectric backfill material is a polymer resin.

15. The electrical machine of claim 12, wherein the pores of the printed scaffold have pore sizes no less than 100 micrometers and no greater than 1000 micrometers.

* * * * *